(12) United States Patent
Parenti et al.

(10) Patent No.: US 11,930,047 B2
(45) Date of Patent: Mar. 12, 2024

(54) UNIFIED POLICY BROKER (71) Applicant: Hewlett Packard Enterprise Development LP, Houston, TX (US)

(72) Inventors: Mark A. Parenti, Milford, NH (US); Timothy M. Ireland, Westford, MA (US); Mathieu Riverin, Littleton, MA (US); Rajaseelan Manavalan, Fremont, CA (US); Uyen T. Chau, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 326 days.

(21) Appl. No.: 17/498,445

(22) Filed: Oct. 11, 2021

(65) Prior Publication Data

US 2023/0115049 A1    Apr. 13, 2023

(51) Int. Cl.
*G06F 21/00*    (2013.01)
*G06F 9/54*    (2006.01)
*H04L 9/40*    (2022.01)

(52) U.S. Cl.
CPC ............ *H04L 63/205* (2013.01); *G06F 9/543* (2013.01); *H04L 63/101* (2013.01)

(58) Field of Classification Search
None
See application file for complete search history.

(56) References Cited

U.S. PATENT DOCUMENTS

| | | | | |
|---|---|---|---|---|
| 8,756,701 | B2* | 6/2014 | Branson | G06F 21/52 709/200 |
| 8,909,779 | B2* | 12/2014 | Clair | H04L 41/0806 386/358 |
| 9,356,932 | B2* | 5/2016 | Krell | H04L 63/20 |
| 10,360,211 | B2* | 7/2019 | Bommireddipalli | G06F 16/24575 |
| 11,070,452 | B1* | 7/2021 | Roy | H04L 43/045 |
| 11,102,053 | B2* | 8/2021 | Ponnuswamy | H04L 43/04 |
| 11,108,828 | B1* | 8/2021 | Curtis | H04L 63/20 |
| 11,323,327 | B1* | 5/2022 | Chitalia | H04L 63/104 |
| 2020/0004742 | A1* | 1/2020 | Nagarajan | G06F 16/248 |

* cited by examiner

*Primary Examiner* — Maung T Lwin
(74) *Attorney, Agent, or Firm* — Park, Vaughan, Fleming & Dowler LLP (57) ABSTRACT

One aspect described in this application provides a unified policy broker. During operation, the system receives configuration information from the set of network devices. At least two network devices in the network can be equipped with a first and a second policy enforcement engine, respectively, for enforcing one or more given policy rules. The system can determine, based on the configuration information, a first and a second representation of the similar policy function corresponding to the first and the second policy enforcement engine, respectively. The system can apply a unified policy model to perform a first mapping from a unified representation of the similar policy function to the first and the second representation. The system can create a unified API based on the unified representation. The system applies, via a user interface, the unified API to configure the similar policy function across the first and the second policy enforcement engines.

20 Claims, 6 Drawing Sheets

UNIFIED POLICY BROKER

BACKGROUND

This disclosure is generally related to a field of network management and networking policies. In general, a network can include a plurality of interconnected network devices, with at least one or more network devices implementing a policy enforcement engine. In a typical network, a plurality of different policy enforcement engines can exist along a network path for enforcing networking policies to manage network traffic. Each policy enforcement engine can be associated with different performance characteristics and capabilities.

BRIEF DESCRIPTION OF THE FIGURES

In the figures, like reference numerals refer to the same figure elements.

DETAILED DESCRIPTION

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

Various network devices residing in a network can be equipped with a policy enforcement engine. A policy enforcement engine can be a software component or a hardware component that can implement a set of networking policies. For example, access control list (ACLs) can be a networking policy that can allow a user to specify rules using an Application Programming Interface (API) to deny a specific type of traffic. Further, networking policies can also correspond to forwarding rules, e.g., Policy Based Forwarding (PBF), or firewall rules. Different policy enforcement engines can be associated with different types of API's. For example, one API may support a certain way of describing or representing a policy while another API may use a different policy representation language.

Each policy enforcement engine can enforce one or more networking policies for managing network traffic. For example, one policy enforcement engine in a first network device along a network traffic path can enforce network security policies and another policy enforcement engine in a second network device along the network traffic path can enforce traffic management policies. In other words, ACLs in a network switch can correspond to the first policy enforcement engine, Firewall rules in firewall appliances or distributed firewalls can correspond to the second policy enforcement engine.

Different types of policy enforcement engines can be associated with a different Application Programming Interface (API). Each type of API can represent the policies with a different terminology. For example, an API associated with a first policy enforcement engine can represent a policy function with a specific terminology while another API associated with a second policy enforcement engine can represent a similar policy function with a different terminology. Although, the existence of different types of policy enforcement engines along a network path can provide flexibility to network administrators, configuring them manually with different management APIs can be difficult and complex. This is because each of these "enforcers" or policy enforcement engines can have their own user interfaces and APIs and can frequently use different terminology for the same functions. Therefore, it can be difficult and complex for a user to learn these different terminologies associated with different policy enforcement engines and then to manually configure them.

Some of the aspects described in this application provide a technical solution to the above-mentioned technical problems by providing a system and method for a unified policy broker that can provide a single user experience and a single API to configure and manage various enforcement options. For example, the system may normalize different terminologies, workflows, and capabilities across different policy enforcement engines. The system may then provide a set of normalized workflows across the different policy enforcement engines so that the user can configure network policies on these engines that may interact and complement each other. In other words, a system may provide the user the flexibility of creating a policy rule using a same service group or qualifiers, e.g., applications. The user can then simply change a policy type or enforcer to be either a network ACL type enforcer or a distributed firewall type enforcer. In response to selecting the specific type of enforcer the system may ensure that the created policy rule is rendered with correct implementation. Specifically, given a unified language or API for defining rules, the user can switch back and forth between different implementations, e.g., east-west firewalls, given a common set of capabilities. The system may also validate that the rule can be applied on a new target enforcer, thereby allowing a seamless migration between different enforcers.

Specifically, the system can automatically monitor the network to obtain configuration information associated with different policy models associated with respective policy enforcement engines in the network. In other words, the system can obtain information about how each of the policy models create policies, define policies, define policy rules, etc. Based on this information the system can create a mapping between a unified policy model and the different policy models. Such a unified policy model can provide a unified API for configuring and managing the different policy enforcement engines with different policy models via a user interface.

The phrase "policy enforcement engine" refers to a software and/or hardware component in a network device that can enforce a set of policy rules.

The phrases "policy enforcement engine" and "enforcer" are used interchangeably in this application.

System Architecture

Figure 1:
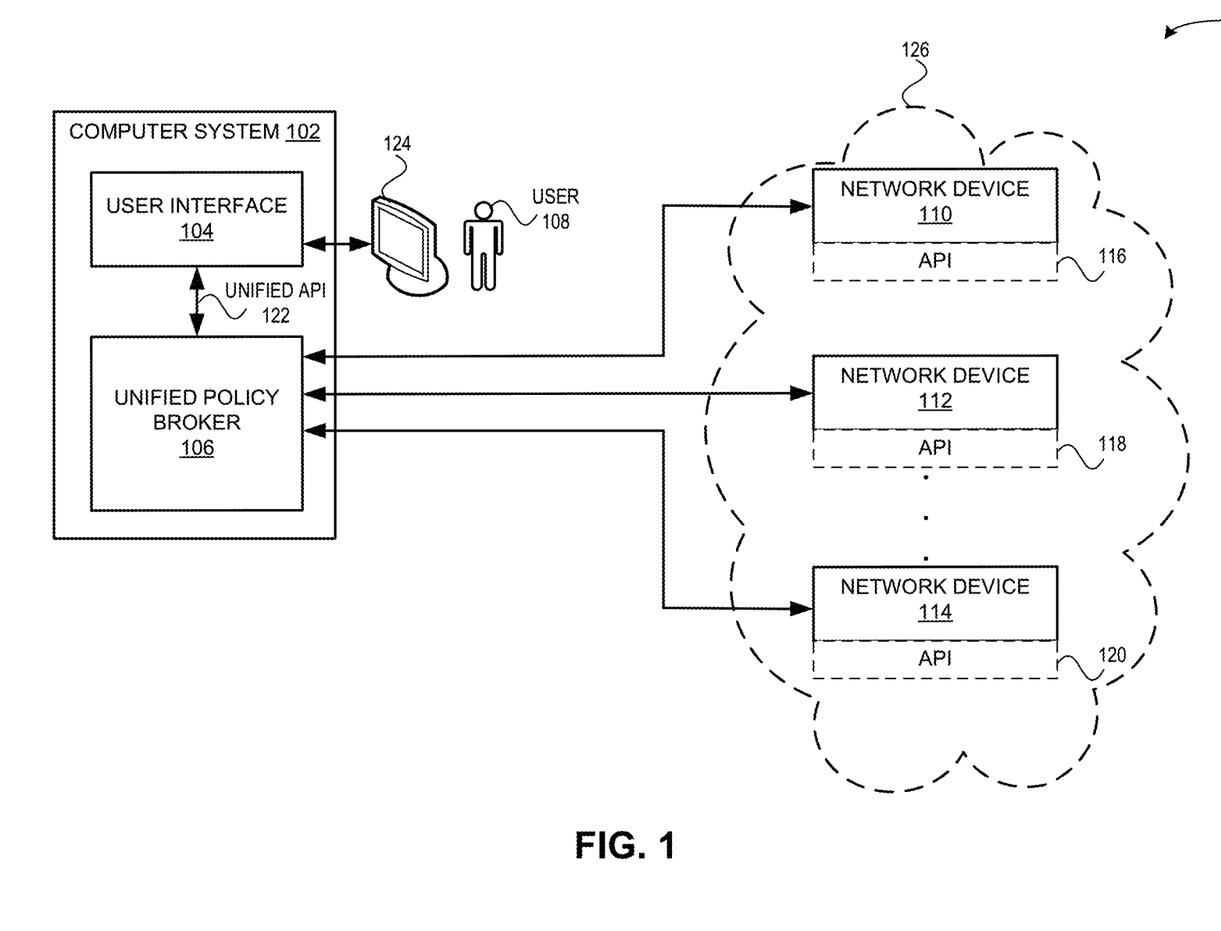
FIG. 1 illustrates an example network environment including a computer system for facilitating a unified policy broker, according to one aspect of the instant application.

FIG. 1 illustrates an example network environment including a computer system for facilitating a unified policy broker, according to one aspect of the instant application. In the example shown in FIG. 1, environment 100 shows a set of network devices or network appliances, e.g., network devices 110-114, residing in a network 126. Network devices 110-114, e.g., network switches, can implement networking policies based on a corresponding policy enforcement engine. These networking policies can include a set of forwarding rules that can be applied to a network packet when some match criteria are satisfied.

For example, one network device may support ACL type policy enforcement engine while another network device may support a firewall type policy enforcement engine. Further, the firewall type of policy enforcement engine may have a similar policy related functionality as the ACL type of policy enforcement engine. However, each policy enforcement engine can be associated with its own type of API, e.g., APIs 116-120. In other words, an API associated with a policy enforcement engine can include different terminologies and representations for a policy function when compared to another API for a similar policy function. A policy function can be associated with policies, policy enforcement choices (allow, deny, reject, etc.), policy rules, traffic specification, etc.

Manually managing and configuring these different policy enforcement engines associated with a specific API can be complex and difficult. This is because the user may have to have knowledge of the different terminologies used across the different policy enforcement engines for different and similar policy functions. Further, the user may have to have knowledge of the capabilities, available computational and memory resources at the network device, and path efficiency along a network path, to be able to configure the appropriate policy enforcement engines to deliver the network flow in an efficient way with desired performance attributes.

One aspect described in this application can provide a technical solution to the above-mentioned problems by providing a unified policy broker that can facilitate configuring and managing of policy enforcement engines with a single point of control. A unified policy broker 106 can facilitate the management of different policy enforcement engines with a unified API 122 via a user interface 104. For example, a computer system 102 implementing a unified policy broker 106 can provide a single point of control to configure various types of policies across the different policy enforcement engines using a unified or single set of policy definitions and structural elements. Further, unified policy broker 106 can in addition to providing a unified API, can also accommodate the differences in the capabilities that exist across the policy enforcement engines, e.g., performance characteristics, traffic enforcement options, resource availability, etc. For example, the different capabilities can further include amount of memory available at a respective network device, processing resource capability at the network device, number of policy rules supported by a policy enforcement engine associated with the network device, latency added to a given network traffic flow, performance characteristics associated with the policy enforcement engine, traffic enforcement options provided by the policy enforcement engine, etc.

Further, unified policy broker 106 can provide unified API 122 via a user interface (UI) 104 associated with a display device 124 to configure and manage the different policy enforcement engines. In one aspect of this application, system 102 can provide a visualization to a user 108 via a graphical user interface which can include information about different policy enforcement engines in network 126, information about how policies are enforced on a given network traffic flow across multiple policy enforcement engines, etc. The operations of unified policy broker 106 is described below with reference to FIGS. 2-6.

Figure 2:
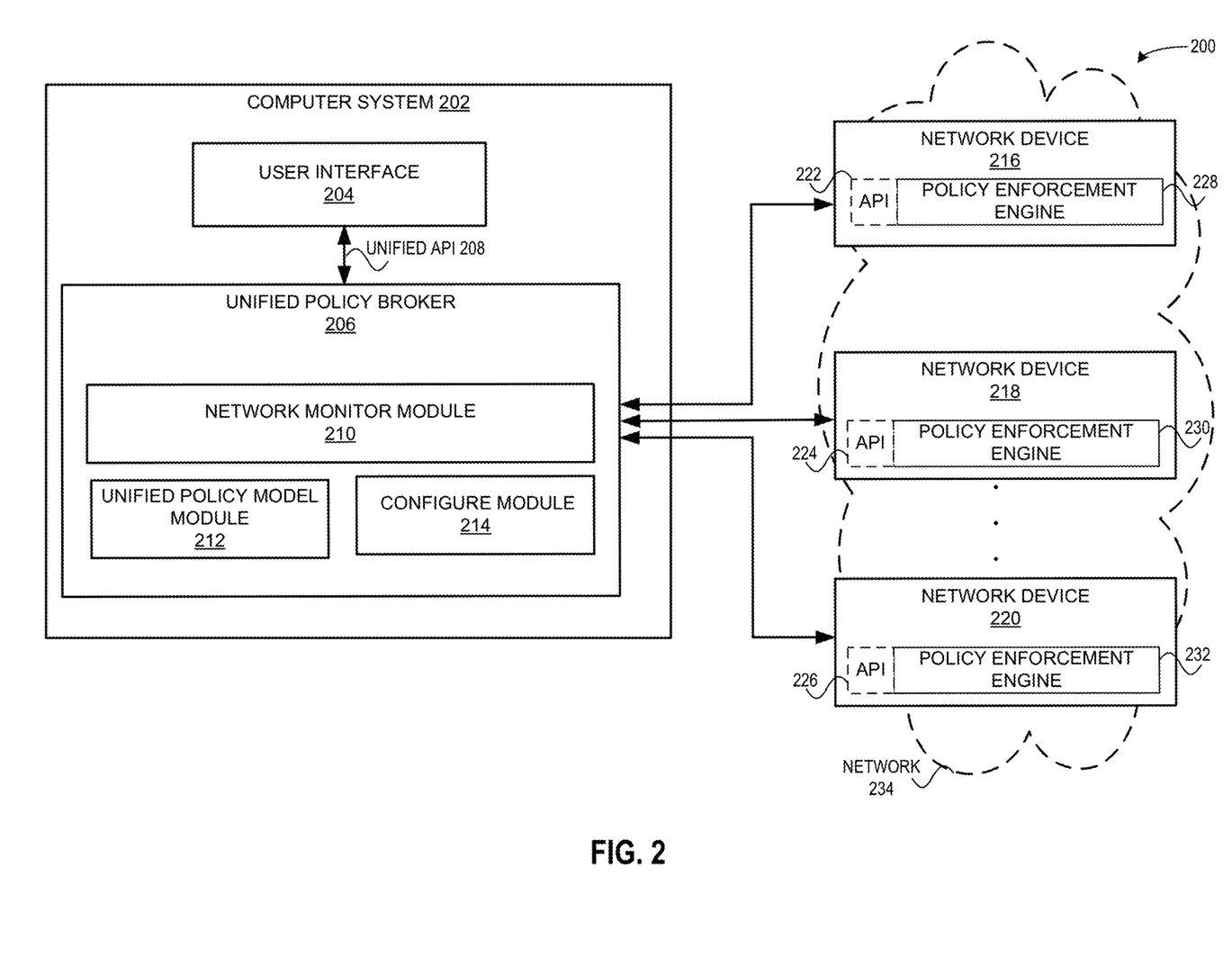
FIG. 2 illustrates an example system architecture for facilitating a unified policy broker, according to one aspect of the instant application.

FIG. 2 illustrates an example system architecture for facilitating a unified policy broker, according to one aspect of the instant application. In the example shown in FIG. 2, system architecture 200 can include a computer system 202 with an integrated controller or a unified policy broker 206 for providing a single user experience and a single API for configuring and managing different policy enforcement engines associated with network devices in a network 234. Network 234 can include a group of interconnected network devices, e.g., 216-220. At least two or more network devices in network 234 can include a policy enforcement engine. For example, network devices 216-220 can include policy enforcement engines 228-232, respectively.

Unified policy broker (UPB) 206 can include a network monitor module 210 that can implement a monitoring mechanism to provide a broad visibility into various attributes associated with network 234, e.g., virtual networking infrastructure running on servers; other kind of data that can facilitate in determining a path taken by network traffic; configuration information associated with a server, a network device, and other configuration information associated with virtual networking.

Network monitor module 210 may also monitor and retrieve information associated with capabilities and resource availability in a network device residing in the network; information related to efficiency of a network path based on the different policy enforcement engines along that network path, etc. For example, a network switch supporting an ACL type policy enforcement engine can provide a limited resource capability whereas a network appliance supporting a firewall type policy enforcement engine can support a large number of policy rules, e.g., in the order of thousands or millions of policy rules, and hence can provide an enhanced resource capability. Further, network monitor module 210 can retrieve network information that can provide end-to-end visibility, e.g., monitoring a path taken by network traffic to enable UPB 206 to apply specific policy rules. For example, UPB 206 may determine, for a given network traffic flow, the different types of policy enforcement engines that exist along a path between a first virtual machine on a first host and a second virtual machine on a second host. UPB 206 may enable a user to apply a unified API to select via user interface 204 one or more policy enforcement engines along the network path to apply a certain policy rule for managing network traffic traversing from the first virtual machine to the second virtual machine. Network monitor module 210 may not be limited to monitoring the above-mentioned attributes but can also extend to provide visibility into virtual networking stacks and other network attributes that can provide an improved perspective of the network environment.

Each policy enforcement engine can have its own user interface and API. For example, policy enforcement engines 228, 230, and 232 can be associated with APIs 222, 224, and 226, respectively. API 222 associated with a policy enforcement engine 226 can use a first representation or a first terminology for defining a policy function, e.g., policy rules, traffic specification, enforcement choices (e.g., allow, deny, reject, etc.). API 224 associated with policy enforcement engine 230 may use a second representation or a second terminology for a similar policy function. In existing systems, a user may apply a policy enforcement engine specific API to configure the policy enforcement engine. In other words, a user is expected to have knowledge of the different terminologies and definitions used across different APIs for similar policy functions on different policy enforcement engines to be able to configure the policy enforcement engines.

Further, due to the diverse set of APIs the user may find it difficult and complex to figure out how the different policy functions associated with different policy enforcement engines interact and/or are interrelated to each other. Understanding such an interrelation between different policy enforcement engines that exist along a network path can be relevant to ensure that the operations of the policy enforcement engines do not conflict with each other. In other words, a user may configure an ACL type policy enforcement engine in a first network device to allow network traffic to be forwarded to a second network device. If the second network device is a firewall appliance, the user may have to ensure that the firewall type policy enforcement engine is not configured to block the network traffic.

With the increase in the different types of policy enforcement engines in a network environment and with multiple policy enforcement engines having its own interface and API, can make the manual configuring and management of the policy enforcement engines difficult and complex. For example, since the different types of policy enforcement engines can exist along an end-to-end physical or logical network, the user may have to go to each one of these infrastructures and understand which type of policies can be interrelated to each other so that a uniform and consistent policy enforcement is applied along the network path associated with the network traffic.

One aspect described in this application, network monitor module 210 can monitor and retrieve configuration information, which can include information about how a policy model associated with a policy enforcement engine is applied to create one or more polices and policy rules; information about how the policy model represents the one or more policies and policy rules; information about how the policy model represents one or more capabilities associated with the policy enforcement engine.

UPB 206 can apply, based on the configuration information and other information retrieved by network monitor module 210, a unified policy model module 212 to translate the different descriptions or representations for similar policy functions into a unified description. In other words, unified policy model module 212 can apply the configuration information and other information retrieved from network monitor module 210 to provide a unified API. A user can apply the unified API via a user interface 204 for configuring and managing the different types of policy enforcement engines deployed in the network environment. Therefore, UPB 206 can provide a unified API with a single user experience to configure, manage, and monitor various enforcers.

In other words, with the unified API and a single user interface the user can configure and manage the different types of policy enforcement engines without the burden of learning and understanding the different terminologies used across different APIs. Specifically, unified policy model module 212 can, based on the configuration information obtained by network monitor module 210, convert the different terminologies associated with the different policy enforcement engines and its respective API into a unified terminology, i.e., translate the different terminologies into a unified representation. Furthermore, unified policy model module 212 can normalize the different terminologies, workflows, and capabilities across enforcers 228-232 in network 234.

The set of normalized workflows across enforcers 228-232 can allow the user to configure network policies on enforcers that may interact and complement each other. For example, an ACL type enforcer on a network switch can provide a filter on traffic allowed on a certain path which can then later be further examined and modified by additional enforcers on that path such as a Firewall appliance.

In one aspect of this application, unified policy model module 212 may obtain the existing policy definitions configured for different network devices in the network environment (with each network device providing a different policy enforcement engine) and can create a mapping between a unified policy model and different policy models associated with respective policy enforcement engines. Such a unified policy model can be used to provide a unified API for configuring and managing the different policy enforcement engines via a user interface. In other words, unified policy model module 212 can create a unified object model for the various policy enforcement engines that perform similar policy functions. Further, unified policy model module 212 can also accommodate and retain some of the relevant differences that exist among the different policy enforcement engines, e.g., performance characteristics, traffic enforcement options, capabilities, etc.

Configure module 214 can configure policy enforcement engines, i.e., 228-232, on network devices 216-220, respectively, based on unified API 208. For example, a user can apply unified API 208 via user interface 204 to select a policy enforcement engine, e.g., policy enforcement engine 232 associated with network device 220, for enforcing a given policy. In one aspect, user interface 204 can provide a visualization which can include information about different policy enforcement engines in network 234, information about how policies are enforced on a given network traffic flow across multiple enforcers. In response to receiving a user input via the user interface, e.g., the user input can include selection of one or more policy enforcement engines for enforcing the given policy rules, configure module 214 can send one or more API commands to a corresponding selected policy enforcement engine. The API commands can include a request to configure the selected policy enforcement engine to enforce one or more given policy rules. Configure module 214 can send API commands based on unified API 208 to the corresponding network device to add a given policy to a policy lookup table maintained at the network device.

In another example, when a user de-selects a policy enforcement engine using unified API 208 via user interface 204, configure module 214 may send API commands to edit or remove entries in corresponding policy lookup table so that the network device including this policy enforcement engine does not act as an enforcing point to apply the given policy. An enforcement point can correspond to a network device interface at which a given policy can be enforced by a policy enforcement engine.

In one aspect of this application, UPB 206 may apply unified policy model module 212 to convert a unified API command to policy enforcement engine specific API commands. For example, when a user selects policy enforcement engine 228 using unified API 208 via user interface 204 to enforce a given policy, unified policy model module 212 may convert a unified representation of a policy function to a policy enforcement engine API 222 specific representation of the policy function. Based on this conversion, configure module 214 may send one or more API specific commands to policy enforcement engine 228 to enforce the given policy.

Figure 3:
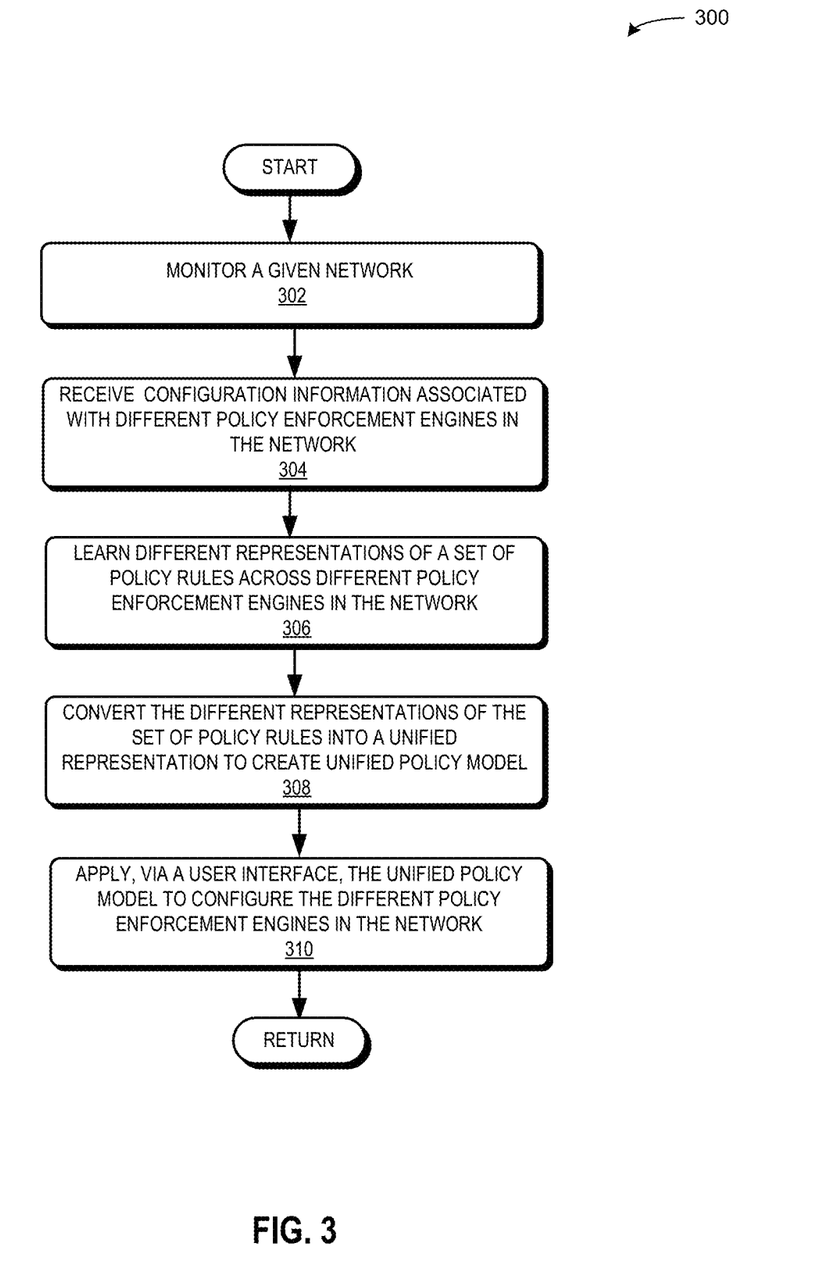
FIG. 3 presents a flowchart illustrating an example process for facilitating a unified policy broker, according to one aspect of the instant application.

FIG. 3 presents a flowchart illustrating an example process for facilitating a unified policy broker, according to one aspect of the instant application. Referring to flowchart 300 in FIG. 3, during operation, a system implementing the unified policy broker can dynamically monitor a network (operation 402) to capture information associated with different policy enforcement engines. Based on the monitoring the system can receive configuration information associated with different policy enforcement engines in the network (operation 404). This configuration information can include information about how a policy model associated with a policy enforcement engine is applied to create one or more polices and policy rules; information about how the policy model represents the one or more policies and policy rules; information about how the policy model represents one or more capabilities associated with the policy enforcement engine.

The system may learn, based on the configuration information, different representations corresponding to a set of similar policy definitions across the different policy enforcement engines in the network (operation 306). The system may also learn different representations corresponding to a set of different capabilities associated with a respective policy enforcement engine. The system may convert or translate the different representations of the set of policy rules into a unified representation (operation 308). In other words, the system can map the different representations associated with the set of similar policy definitions to a unified representation. For example, the system may determine, based on the configuration information, a first representation and a second representation of the similar policy function corresponding to a first and a second policy enforcement engine, respectively. The system may then apply a unified policy model to perform a first mapping from a unified representation of the similar policy function to the first representation and the second representation. The unified representation can provide a unified definition of the similar policy function.

The system may also map the different representations corresponding to set of different capabilities to multiple unified representations, thereby retaining the useful differences that exist among the different policy enforcement engines. For example, the system can also determine, based on the configuration information, a third representation of a first capability associated with the first policy enforcement engine and a fourth representation of a second capability associated with the second policy enforcement engine. The system may then apply the unified policy model to perform a second mapping from the third representation and the fourth representation to a corresponding first unified representation and a second unified representation, thereby retaining differences in capabilities associated with the first and the second policy enforcement engine. The system can then add the second mapping to the unified API and can configure the first and the second policy enforcement engines accordingly. The system can create or provide a unified policy model based on the different mappings, thereby providing a unified API to a user via a user interface. This unified policy model can enable a user to apply the unified API, via a user interface, to configure the different policy enforcement engines (operation 310), thereby providing a single user experience and a single point of control with a unified API. The operation then returns.

Figure 4:
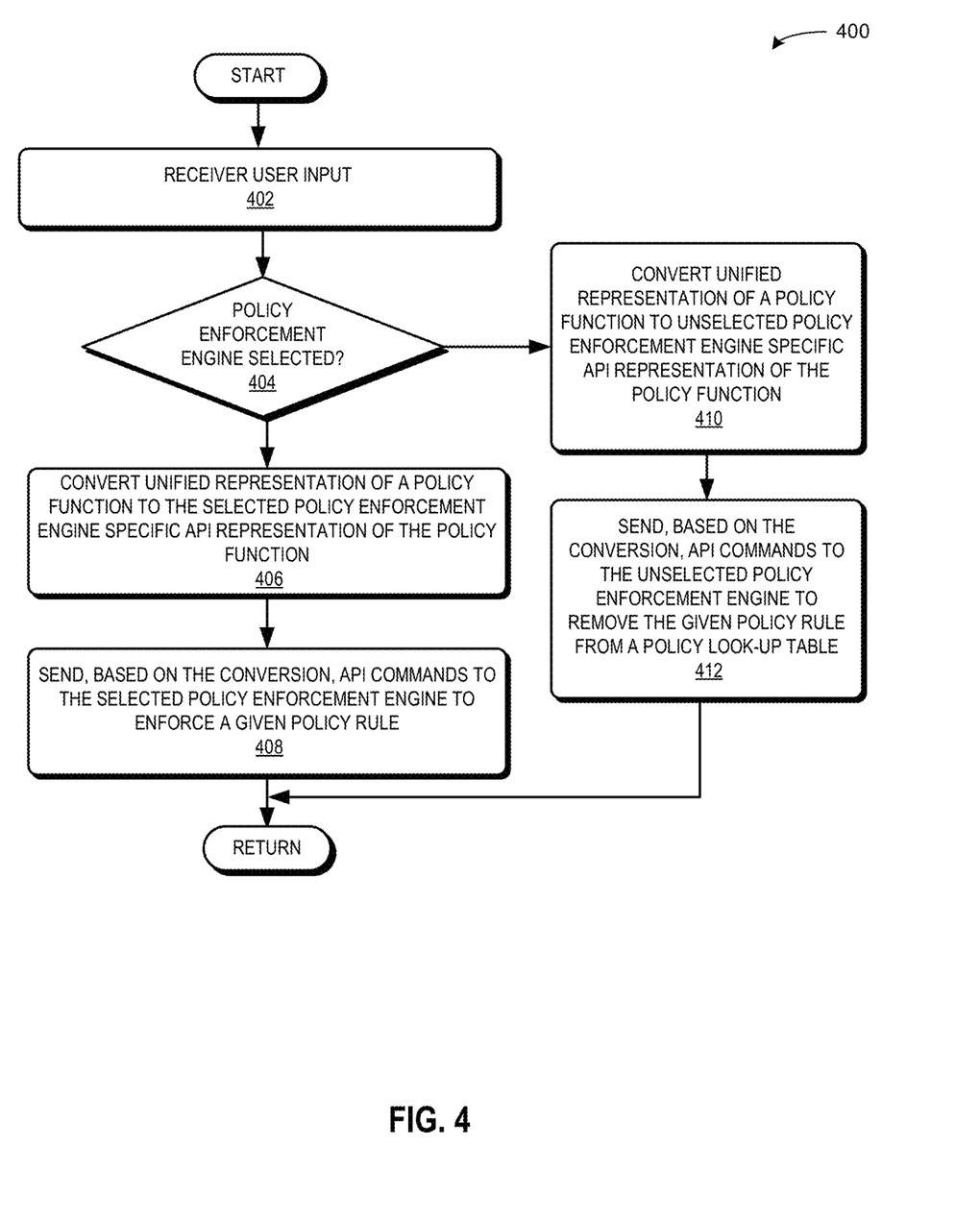
FIG. 4 presents a flowchart illustrating an example process for configuring and managing policy enforcement engines based on a unified policy broker, according to one aspect of the instant application.

FIG. 4 presents a flowchart illustrating an example process for configuring and managing policy enforcement engines based on a unified policy broker, according to one aspect of the instant application. One aspect described in the instant application can provide a user interface to enable a user to apply the unified API to select, based on the configuration information and other information (that was retrieved during a monitoring process), one or more policy enforcement engines that exist along a network path for enforcing one or more given policies.

The system may receive a user input via a user interface based on a unified API (operation 402). The user input may include a selection of one or more policy enforcement engines for enforcing one or more given policy rules. In response to receiving the user input, the system may determine whether the user input includes a selection of a policy enforcement engine (operation 404). When the user input includes a selection of at least one policy enforcement engine, the system may convert, based on a unified policy model, a unified representation of a policy function to the selected policy enforcement specific API representation of the policy function (operation 406). The system may then send, based on the conversion in operation 406, one or more API commands to the selected policy enforcement engine to enforce the given policy rule (operation 408), then operation then returns.

When the user input indicates that at least one policy enforcement engine is not selected, the system may convert, based on the unified policy model, a unified representation of a policy function to the unselected policy enforcement specific API representation of the policy function (operation 410). The system may then send, based on the conversion in operation 410, one or more API commands to the unselected policy enforcement engine to remove the given policy rule from a policy look-up table (operation 412), then operation then returns.

Figure 5:
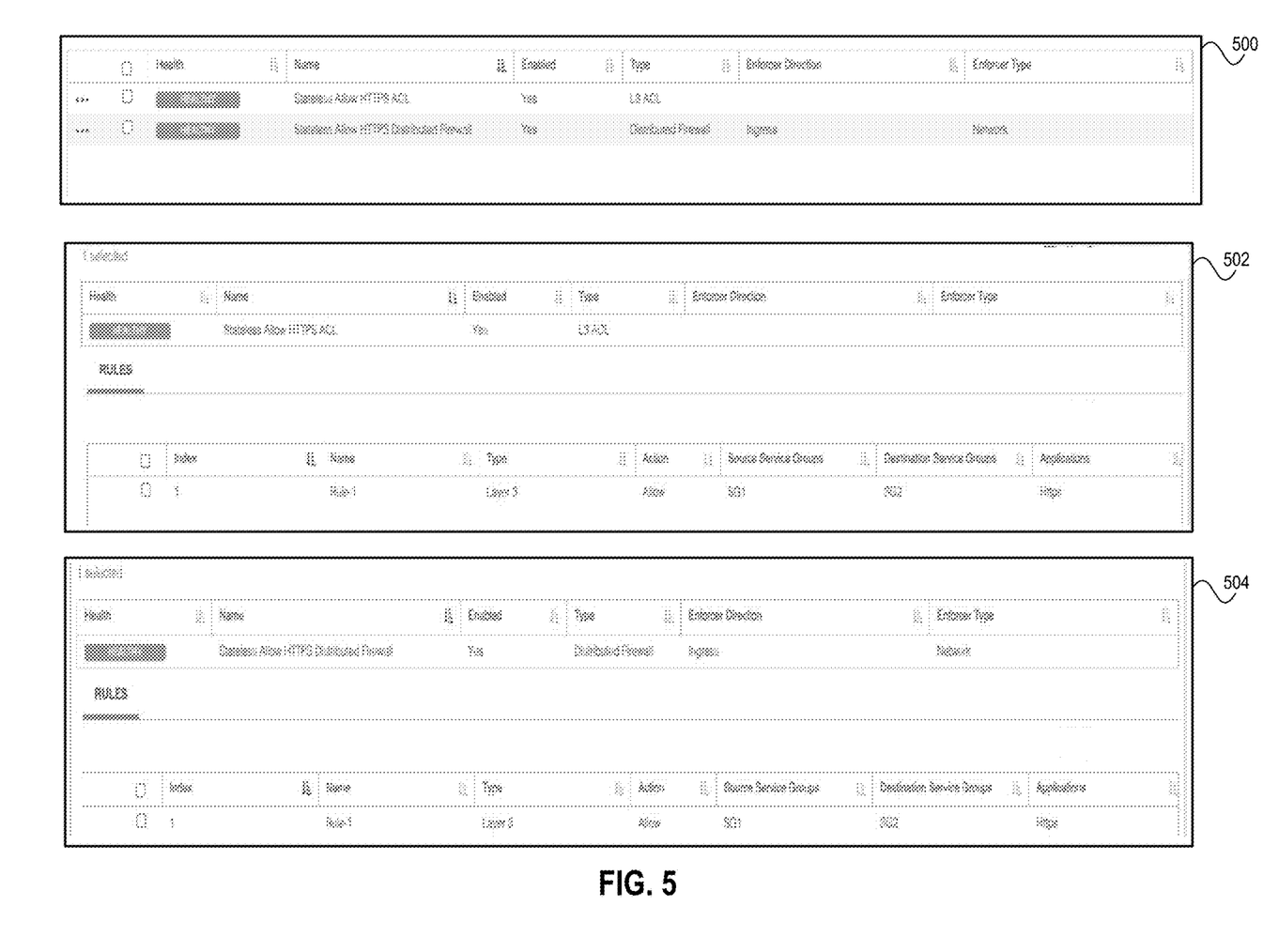
FIG. 5 illustrates an example user interface for selecting an enforcer from a list of enforcers, according to one aspect of the instant application.

FIG. 5 illustrates an example user interface for selecting an enforcer from a list of enforcers, according to one aspect of the instant application. In the example shown in FIG. 5, the system can provide a user interface 500 to enable a user to select from a list of enforcers. For example, user interface 500 lists two different enforcers, i.e., an ACL type enforcer and a distributed firewall type enforcer. In other words, a system may provide the user the flexibility of creating a policy rule using a same service group or qualifiers, e.g., applications. The user can then simply change a policy type or enforcer to be either a network ACL type enforcer or a distributed firewall type enforcer. In response to selecting the specific type of enforce the system may ensure that the created policy rule is rendered with correct implementation. For example, user interface 502 indicates that the user has selected an ACL type enforcer and user interface 504 indicates that the user has selected a distributed firewall type of enforcer. Although both the enforcers can implement a similar policy, the user has the flexibility of selecting between the two enforcers. Therefore, given a unified language or API for defining rules, the user can switch back and forth between different implementations, e.g., east-west firewalls, given a common set of capabilities. The system may also validate that the rule can be applied on a new target enforcer, thereby allowing a seamless migration between different enforcers.

Computer System for Facilitating Automatic Policy Engine Selection

Figure 6:
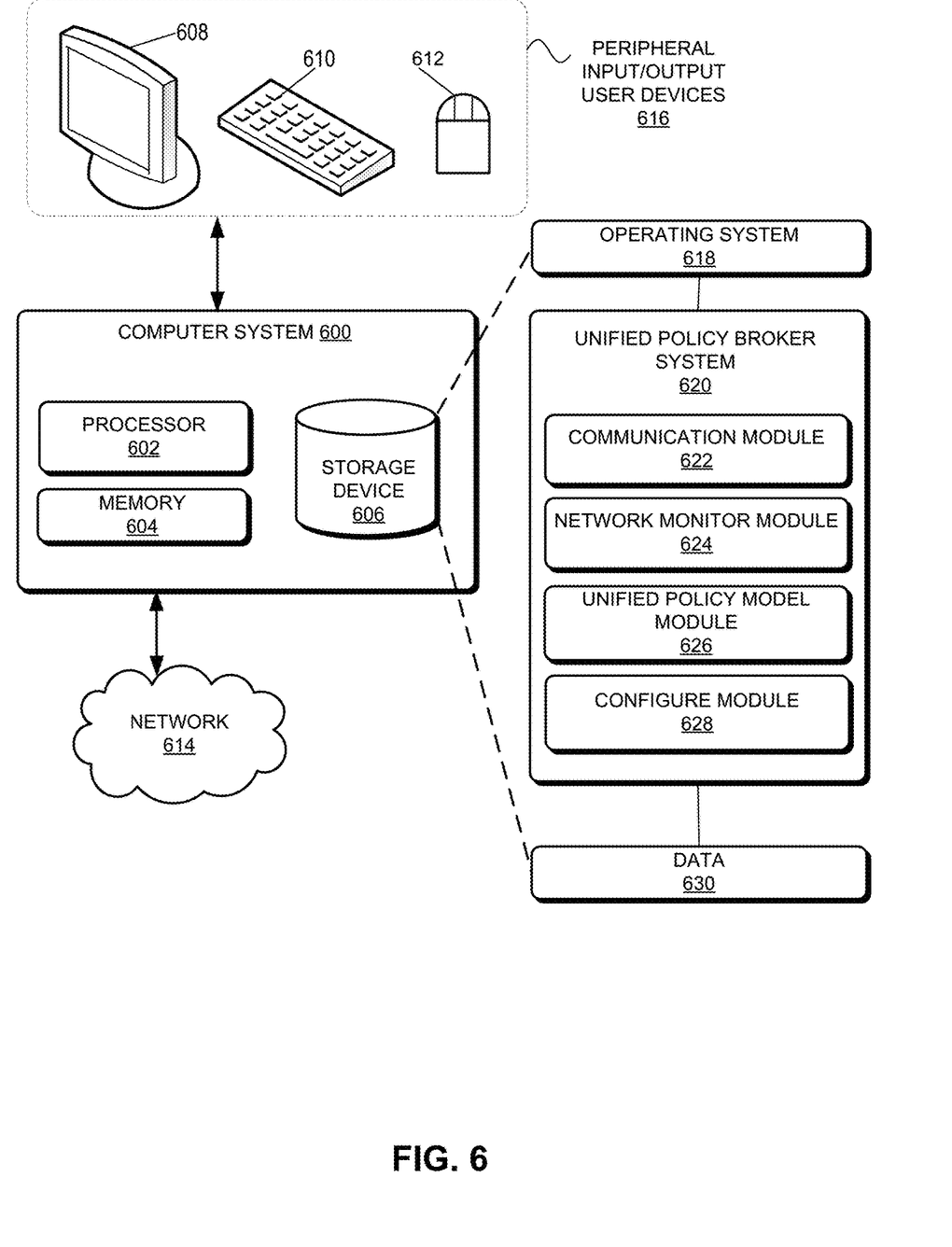
FIG. 6 illustrates an example computer system that facilitates a unified policy broker, according to one aspect of the instant application.

FIG. 6 illustrates an example computer system that facilitates a unified policy broker, according to one aspect of the instant application. In this example, computer system 600 can include a processor 602, a memory 604, a storage device 606. Computer system 600 can be coupled to peripheral input/output (I/O) user devices 616, e.g., a display device 608, a keyboard 610, and a pointing device 612. Storage device 606 can store instructions for an operating system 618, a unified policy broker system 620, and data 630. Data 630 can include any data that is desirable as input or that is generated as output by the methods and/or processes described in this disclosure. Computer system 600 can be coupled via one or more network interfaces to a network 614.

In one aspect of this application, unified policy broker system 620 can include instructions, which when executed by processor 602 can cause computer system 600 to perform methods and/or processes described in this disclosure. Unified policy broker system 620 can include a communication module 622 for sending network packets to other nodes in network 614 via one or more network interfaces. Communication module 622 can also receive/obtain network packets from other network nodes in network 614 via one or more network interfaces. Unified policy broker system 620 can further include instructions for implementing a network monitor module 624 for monitoring network 614 and network devices residing in network 614. Further, network monitor module 624 can apply communication module 624 to receive configuration information and a set of attributes associated with network 614 being monitored.

Unified policy broker system 620 can include a unified policy model module 626 to determine a unified representation of a set of policy definitions. In other words, policy enforcement engines associated with a respective network device in network 614 can be configured using a specific API, i.e., different policy enforcement engines can be configured with different API's. Each API can include a different representation or description of a set of policy definitions. For example, a first API associated with a first policy enforcement engine can provide a first representation of a policy definition, e.g., a policy rule, whereas a second API associated with a second policy enforcement engine can provide a second representation of a similar policy rule. Often a network can include multiple policy enforcement engines and multiple APIs. Configuring such policy enforcement engines with different APIs can be complex and difficult.

Unified policy broker system 620 can apply unified policy model module 626 to convert these different representations of policy definitions across different policy enforcement engines in the network into a unified representation or a unified API. In other words, unified policy model module 626 can generate a first type of mapping between different representations of similar policy definition and a unified policy representation; and a second type of mapping between a set of different representations of different capabilities of policy enforcement engines and a set of unified representations instead of mapping such capability differences to a single unified representation. The first type of mapping provides a unified representation for the different representations of similar policy functions, whereas the second type of mapping preserves the differences in capabilities, e.g., performance characteristics, traffic enforcement options, etc., that exist among the different policy enforcement engines. Such a unified API can be applied to configure the different policy enforcement engines.

Configure module 628 can configure one or more selected policy enforcement engines so that they can enforce the assigned policy rules. In one aspect, when a policy enforcement engine along a network path is not selected, configure module 628 may configure it in way that the policy enforcement engine does not enforce the unassigned subset of given policy rules.

One aspect described in this application can provide a system and method for facilitating a unified policy broker. During operation, the system can receive configuration information from the set of network devices. At least two network devices in the network can be equipped with a first policy enforcement engine and a second policy enforcement engine, respectively, for enforcing one or more given policy rules. Each policy enforcement engine can be associated with a different API providing a different representation of a similar policy function. The system can determine, based on the configuration information, a first representation and a second representation of the similar policy function corresponding to the first and the second policy enforcement engine, respectively. Further, the system can apply a unified policy model to perform a first mapping from a unified representation of the similar policy function to the first representation and the second representation. The unified representation can provide a unified definition of the similar policy function. Based on the first mapping, the system can create a unified API by representing the first and the second representation of the similar policy function with the unified representation. The system can then apply, via a user interface, the unified API to configure the similar policy function across the first and the second policy enforcement engine.

In a variation on this aspect, the system can determine, based on the configuration information, a third representation of a first capability associated with the first policy enforcement engine and a fourth representation of a second capability associated with the second policy enforcement engine. The system can then apply the unified policy model to perform a second mapping from the third representation and the fourth representation to a corresponding first unified representation and a second unified representation, thereby retaining differences in capabilities associated with the first and the second policy enforcement engine. Further, the system can add the second mapping to the unified API and configure, based on the unified API, the first and the second policy enforcement engines.

In a variation on this aspect, the first capability and the second capability include one or more of: amount of memory available at a respective network device; processing resource capability at the network device; number of policy rules supported by a policy enforcement engine associated with the network device; latency added to a given network traffic flow; performance characteristics associated with the policy enforcement engine; and traffic enforcement options provided by the policy enforcement engine.

In a variation on this aspect, the third representation is different from the fourth representation.

In a variation on this aspect, the user interface can include a visualization of different policy enforcement engines in the network; and information about how policies are enforced on a given network traffic flow across multiple policy enforcement engine.

In a variation on this aspect, the system can apply, via the user interface, the unified API to configure the similar policy function across the first and the second policy enforcement engines by, in response to determining that a user has selected the first policy enforcement engine for enforcing the one or more given policy rules, converting the unified representation of the similar policy function to the first representation; and sending, based on the conversion, one or more API commands to a network device implementing the first policy enforcement engine to enforce the one or more given policy rules.

In a variation on this aspect, the system can apply via the user interface, the unified API to configure the similar policy function across the first and the second policy enforcement engines by, in response to determining that a user has de-selected the first policy enforcement engine for enforcing the one or more given policy rules, converting the unified representation of the similar policy function to the first representation; and sending, based on the conversion, one or more API commands to a network device implementing the first policy enforcement engine to remove the one or more given policy rules from a policy look-up table.

In a variation on this aspect, the similar policy function can include one or more of: a policy rule; a policy; traffic specification; and a set of enforcement choices.

In a further variation, the first representation can be different from the second representation.

In a further variation, the configuration information can include information about how a policy model associated with a policy enforcement engine is applied to create one or more polices and policy rules; information about how the policy model represents the one or more policies and policy rules; and information about how the policy model represents one or more capabilities associated with the policy enforcement engine.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, ASIC chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of aspects have been presented for purposes of illustration and description. They are not intended to be exhaustive or to limit the scope of this disclosure to the forms disclosed. Accordingly, many modifications and variations will be apparent to practitioners skilled in the art.

What is claimed is:

1. A computer-implemented method comprising:
   receiving, at a controller, configuration information from the set of network devices, wherein at least two network devices are equipped with a first policy enforcement engine and a second policy enforcement engine, respectively, for enforcing one or more given policy rules, wherein each policy enforcement engine is associated with a different Application Programming Interface (API), and wherein the API provides a different representation of a similar policy function;
   determining, based on the configuration information, a first representation and a second representation of the similar policy function corresponding to the first and the second policy enforcement engine, respectively;
   applying a unified policy model to perform a first mapping from a unified representation of the similar policy function to the first representation and the second representation, wherein the unified representation provides a unified definition of the similar policy function;
   creating, based on the first mapping, a unified API by representing the first and the second representation of the similar policy function with the unified representation; and
   applying, via a user interface, the unified API to configure the similar policy function across the first and the second policy enforcement engines.

2. The computer-implemented method of claim 1, further comprising:
   determining, based on the configuration information, a third representation of a first capability associated with the first policy enforcement engine and a fourth representation of a second capability associated with the second policy enforcement engine;
   applying the unified policy model to perform a second mapping from the third representation and the fourth representation to a corresponding first unified representation and a second unified representation, thereby retaining differences in capabilities associated with the first and the second policy enforcement engine;
   adding the second mapping to the unified API; and
   configuring, based on the unified API, the first and the second policy enforcement engines.

3. The computer-implemented method of claim 2, wherein the first capability and the second capability include one or more of:
   amount of memory available at a respective network device;
   processing resource capability at the network device;
   number of policy rules supported by a policy enforcement engine associated with the network device;
   latency added to a given network traffic flow;
   performance characteristics associated with the policy enforcement engine; and
   traffic enforcement options provided by the policy enforcement engine.

4. The computer-implemented method of claim 2, wherein the third representation is different from the fourth representation.

5. The computer-implemented method of claim 1, wherein the user interface includes a visualization of,
   different policy enforcement engines in the network; and
   information about how policies are enforced on a given network traffic flow across multiple policy enforcement engines.

6. The computer-implemented method of claim 1, wherein applying, via the user interface, the unified API to configure the similar policy function across the first and the second policy enforcement engines comprises:
   in response to determining that a user has selected the first policy enforcement engine for enforcing the one or more given policy rules, converting the unified representation of the similar policy function to the first representation; and
   sending, based on the conversion, one or more API commands to a network device implementing the first policy enforcement engine to enforce the one or more given policy rules.

7. The computer-implemented method of claim 1, wherein applying, via the user interface, the unified API to configure the similar policy function across the first and the second policy enforcement engines comprises:
in response to determining that a user has de-selected the first policy enforcement engine for enforcing the one or more given policy rules, converting the unified representation of the similar policy function to the first representation; and
sending, based on the conversion, one or more API commands to a network device implementing the first policy enforcement engine to remove the one or more given policy rules from a policy look-up table.

8. The computer-implemented method of claim 1, wherein the similar policy function includes one or more of:
a policy rule;
a policy;
traffic specification; and
a set of enforcement choices.

9. The computer-implemented method of claim 1, wherein the first representation is different from the second representation.

10. The computer-implemented method of claim 1, wherein the configuration information includes:
information about how a policy model associated with a policy enforcement engine is applied to create one or more polices and policy rules;
information about how the policy model represents the one or more policies and policy rules; and
information about how the policy model represents one or more capabilities associated with the policy enforcement engine.

11. A computer system, comprising:
a processor;
a memory coupled to the processor and storing instructions which, when executing by the processor, cause the processor to perform a method, the method comprising:
receiving, at a controller, configuration information from the set of network devices, wherein at least two network devices are equipped with a first policy enforcement engine and a second policy enforcement engine, respectively, for enforcing one or more given policy rules, wherein each policy enforcement engine is associated with a different Application Programming Interface (API), and wherein the API provides a different representation of a similar policy function;
determining, based on the configuration information, a first representation and a second representation of a similar policy function corresponding to the first and the second policy enforcement engines, respectively;
applying a unified policy model to perform a first mapping from a unified representation of the similar policy function to the first representation and the second representation, wherein the unified representation provides a unified definition of the similar policy function;
creating, based on the first mapping, a unified API by representing the first and the second representation of the similar policy function with the unified representation; and
applying, via a user interface, the unified API to configure the similar policy function across the first and the second policy enforcement engines.

12. The computer system of claim 11, the method further comprising:
determining, based on the configuration information, a third representation of a first capability associated with the first policy enforcement engine and a fourth representation of a second capability associated with the second policy enforcement engine;
applying the unified policy model to perform a second mapping from the third representation and the fourth representation to a corresponding first unified representation and a second unified representation, thereby retaining differences in capabilities associated with the first and the second policy enforcement engine;
adding the second mapping to the unified API; and
configuring, based on the unified API, the first and the second policy enforcement engines.

13. The computer system of claim 12, wherein the first capability and the second capability include one or more of:
amount of memory available at a respective network device;
processing resource capability at the network device;
number of policy rules supported by a policy enforcement engine associated with the network device;
latency added to a given network traffic flow;
performance characteristics associated with the policy enforcement engine; and
traffic enforcement options provided by the policy enforcement engine.

14. The computer system of claim 12, wherein the third representation is different from the fourth representation.

15. The computer system of claim 11, wherein the user interface includes a visualization of,
different policy enforcement engines in the network; and
information about how policies are enforced on a given network traffic flow across multiple policy enforcement engines.

16. The computer system of claim 11, wherein applying, via the user interface, the unified API to configure the similar policy function across the first and the second policy enforcement engines comprises:
in response to determining that a user has selected the first policy enforcement engine for enforcing the one or more given policy rules, converting the unified representation of the similar policy function to the first representation; and
sending, based on the conversion, one or more API commands to a network device implementing the first policy enforcement engine to enforce the one or more given policy rules.

17. The computer system of claim 11, wherein applying, via the user interface, the unified API to configure the similar policy function across the first and the second policy enforcement engines comprises:
in response to determining that a user has de-selected the first policy enforcement engine for enforcing the one or more given policy rules, converting the unified representation of the similar policy function to the first representation; and
sending, based on the conversion, one or more API commands to a network device implementing the first policy enforcement engine to remove the one or more given policy rules from a policy look-up table.

18. The computer system of claim 11, wherein the similar policy function includes one or more of:
a policy rule;
a policy;
traffic specification; and
a set of enforcement choices.

19. The computer system of claim 11, wherein the first representation is different from the second representation.

20. The computer system of claim 11, wherein the configuration information includes:
- information about how a policy model associated with a policy enforcement engine is applied to create one or more polices and policy rules;
- information about how the policy model represents the one or more policies and policy rules; and
- information about how the policy model represents one or more capabilities associated with the policy enforcement engine.

\* \* \* \* \*